UNITED STATES PATENT OFFICE.

DANIEL M. LAMB, OF STRATHROY, CANADA.

IMPROVEMENT IN PREPARING WATER-PROOF GUMS FROM FLAX-SEED, &c.

Specification forming part of Letters Patent No. 140,283, dated June 24, 1873; application filed January 28, 1873.

*To all whom it may concern:*

Be it known that I, DANIEL MARTIN LAMB, of Strathroy, in the county of Middlesex and Province of Ontario, Canada, machinist, have invented a new and useful art of producing Water-Proof Gum, of which the following is a specification:

My invention is based on the discovery that flax-seed contains a large per centage of caoutchouc; and my invention consists in the production from such seed of a water-proof gum capable of vulcanization, and applicable to many useful purposes in the arts as a substitute for India-rubber or gutta percha.

The simplest, cheapest, and best way now known to me of attaining this result is to submit the seed in bulk to a process of maceration and pressure, by which means the gummy liquid is effectually eliminated from the other matter. It may then be inspissated by evaporation, cleansed, and vulcanized in any of the ways usually practiced in treating caoutchouc, which product this gum closely resembles in its characteristics. My process is so simple as to require no special adaptation of machinery to carry it out, and, such as needed, is well known in the arts; consequently no description of such machinery is required. I prefer to crush or boil the seed before fermenting them, in order that germination may be prevented. I have, however, produced good results by adding to a given quantity of flax-seed four times its bulk of water, and placing it in a tight vessel for about forty-eight hours, during which time fermentation occurs, and results in decomposition sufficient to permit a viscid liquid to be run off, while the solid matter is retained by suitable strainers. The aqueous matter is then evaporated from the liquid, leaving an elastic gum possessing the properties of caoutchouc. The residuum may be used as a food for cattle, and is superior to the cake produced by expressing oil from linseed meal. The separation of the liquid and gum from the seed-hulls and other matter may be aided by pressure.

While describing the fermentation of the material as constituting a part of the preferred mode of carrying out my process, I do not desire to be understood as limiting myself thereto. My invention may be carried out, though less economically, by maceration, pressing, and evaporation, without the aid of fermentation.

As it is well known that a vulcanizable gum may be produced from the inspissated juice of other seed as well as that of flax, I do not desire to limit myself to flax-seed in the application of my new process of maceration and inspissation for the production of such gum. Rape, cotton, and some other seeds can be used.

The preliminary maceration, as an aid to the economical separation of the gum, and utilization of the residuum, is the most important feature in my new process.

I claim as new—

The art or process of producing water-proof gum from flax-seed or other seeds possessing similar properties, by maceration, straining, and subsequent inspissation.

DANIEL M. LAMB.

Witnesses:
 OCTAVIUS KNIGHT,
 WALTER ALLEN.